United States Patent [19]

Prewo

[11] 4,341,840
[45] * Jul. 27, 1982

[54] COMPOSITE BEARINGS, SEALS AND BRAKES

[75] Inventor: Karl M. Prewo, Vernon, Conn.

[73] Assignee: United Technologies Corporation, Hartford, Conn.

[*] Notice: The portion of the term of this patent subsequent to May 5, 1998, has been disclaimed.

[21] Appl. No.: 243,317

[22] Filed: Mar. 13, 1981

[51] Int. Cl.$^3$ .............................................. B32B 9/00
[52] U.S. Cl. ................................. 428/408; 428/367; 428/410; 428/426
[58] Field of Search ............... 428/288, 367, 408, 426, 428/410

[56] References Cited

U.S. PATENT DOCUMENTS

| | | | |
|---|---|---|---|
| 4,171,991 | 10/1979 | Lindmayer | 428/408 |
| 4,248,925 | 2/1981 | Ambrogi | 428/408 |
| 4,263,367 | 4/1981 | Prewo | 428/400 |
| 4,265,968 | 5/1981 | Prewo | 428/408 |

OTHER PUBLICATIONS

Amateau, M. F. et al., "Friction and Wear Behavior of Metal Matrix-Graphite Fiber Composites," Aerospace Corporation Report ATR-75 (9450)-3, May 1975.
Giltrow, J. P. et al., "The Role of the Counterface in the Friction and Wear of Carbon Fiber Reinforced Thermosetting Resins," Wear, 16, 1970 pp. 359-374.
Ohmae, N. et al., "Characteristics of Fretting of Carbon Fiber Reinforced Plastics," Wear, 29, 1974, pp. 345-353.
Gardos, M. N. et al., "Self-Lubricating Composite Bearing Materials", Air Force Materials Lab. Report AFML-Tr-77-69, Feb. 1977.
Chang, H. W. et al., "Contribution of Oxidation to the Wear of Carbon-Carbon Composites", Carbon, vol. 16, No. 5, 1978, pp. 309-312.

Primary Examiner—James J. Bell
Attorney, Agent, or Firm—Harry J. Gwinnell

[57] ABSTRACT

A bearing, seal or brake material is disclosed comprising a graphite fiber reinforced glass matrix material. The bearings, seals and brakes according to the present invention have a coefficient of friction of about 0.15 to about 0.7 and a steady state wear rate less than $40 \times 10^{-10}$ cm/cm. The advantage of such bearings, seals and brakes are stability at higher operating temperatures, low reactivity to chemical and other severe environments, high thermal conductivity, superior dimensional stability, low coefficient of friction for seals and bearings, high coefficient of friction with increasing loads without fade for brakes, and low steady state wear rate.

5 Claims, 6 Drawing Figures

WEAR OF GRAPHITE FIBER REINFORCED PIN ON TITANIUM DISC

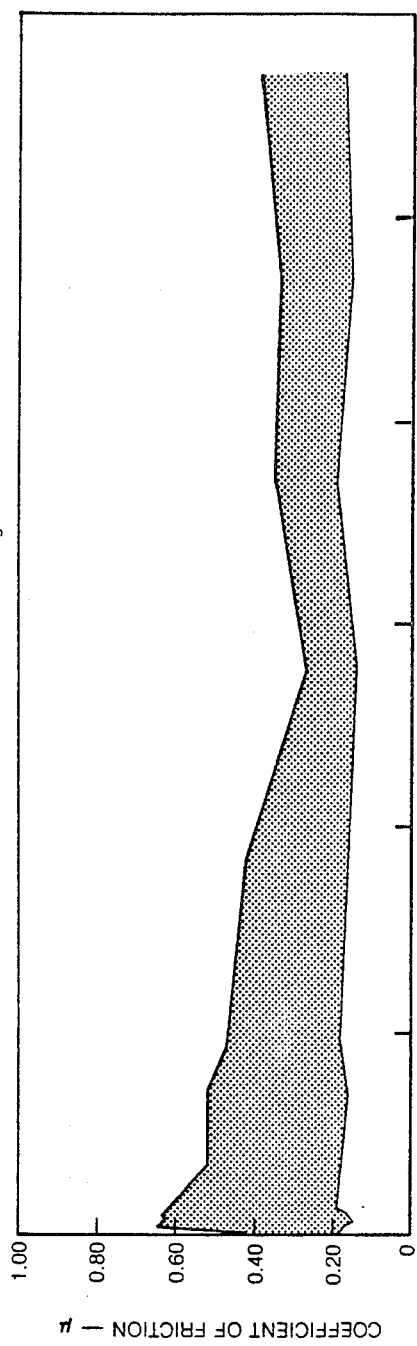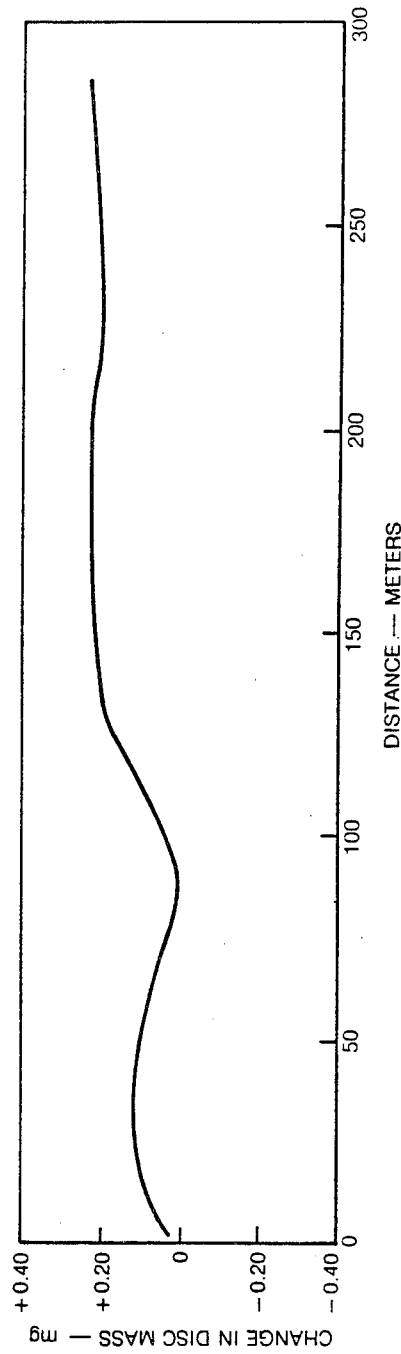
FIG.3A
FIG.3B

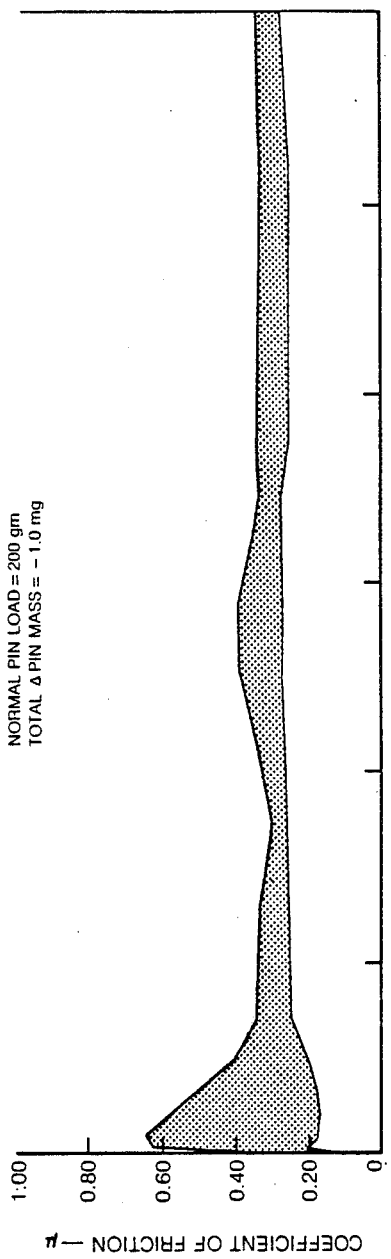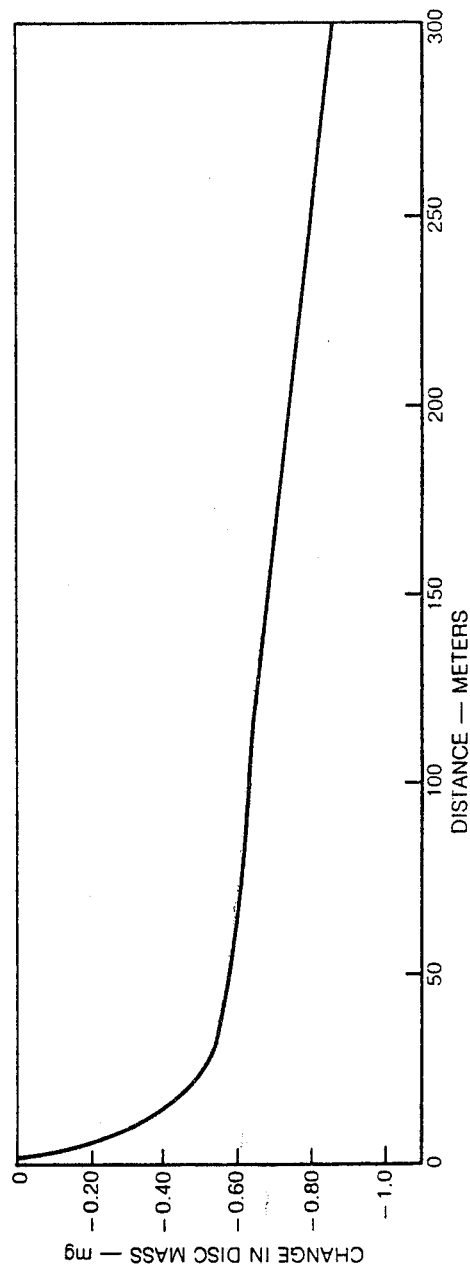
FIG. 4A
FIG. 4B

COMPOSITE BEARINGS, SEALS AND BRAKES

CROSS REFERENCE TO RELATED APPLICATIONS

Commonly assigned, copending applications: Ser. No. 054,098, filed July 2, 1979, now U.S. Pat. No. 4,256,378 directed to graphite-glass composite laser mirrors; Ser. No. 092,168, filed Nov. 7, 1979, now U.S. Pat. No. 4,263,367 to discontinuous graphite fiber reinforced glass composites; and Ser. No. 135,375, filed Mar. 28, 1980, now U.S. Pat. No. 4,265,968 directed to graphite fiber reinforced glass composites, are incorporated by reference.

DESCRIPTION

1. Technical Field

The field of art to which this invention pertains is wear resistant composites and specifically bearings, seals and brakes.

2. Background Art

In any dynamic mechanical system, the relative wear and friction of the components can become a limiting factor in overall performance efficiency and life. This is true of both engineering applications designed principally for wear, such as bearings and dynamic seals, as well as in the less obvious cases where relative motion between parts causes fretting and material surface damage such as brakes. As a result, major life cycle cost and performance criteria can be affected by the tribological performance of the materials involved. Fiber reinforced resin matrix composites have become an important class of materials available to the designer to enhance system wear performance and more recently even fiber reinforced metal matrix composites (principally graphite fiber reinforced metals) have achieved some acceptance in this area.

A wide range of fiber reinforced resin matrix composites has been studied in the past to document the importance of such factors as reinforcing fiber type, fiber orientation, fiber content, matrix properties and environmental considerations. It has been demonstrated that exceptionally low levels of material wear can be achieved in conjunction with low values of coefficient of friction in such an environment. This has been the case particularly for graphite fiber reinforced composites where the presence of the graphite fibers introduces a self-lubricating quality to composite performance. Because of the severe environmental limitations imposed by the resin matrices of these systems, however, there are restraints to their areas of applicability. A major limitation, of course, has to do with their maximum use temperature. Several very recent efforts have tried to achieve use temperatures of as high as 600° F. (316° C.) using polyimides as resin matrices. However, even here it is clear that higher use temperatures are unlikely and other environmental factors, such as moisture, have a very important deleterious effect.

To overcome these limitations, and also to provide new areas of application, considerable attention has been given to the tribology of graphite fiber reinforced metals. Aluminum, copper, lead, and even magnesium alloys reinforced with continuous graphite fibers appear to offer unique combinations of friction, wear, and electrical properties. In every case the presence of graphite fibers has caused these composites to exhibit low values of coefficient of friction, and very low levels of wear rate, when in dynamic contact with a variety of metal surfaces.

As in the case of the resin matrices described above, however, even these metal matrix systems have limitations. They are susceptible to corrosive attack by a wide variety of environments. High humidity, salts, acids and bases all can cause significant attack of the metal surfaces. In addition, they are limited in their maximum use temperature capability through matrix softening.

Accordingly, what is needed in the art is a frictional and wear composite material capable of maintaining its dimensional stability with long term use in adverse environments even at high temperatures.

DISCLOSURE OF INVENTION

Composite bearings, seals and brakes comprised of graphite fiber reinforced glass matrix material are described which are stable at high temperatures, have low reactivity towards corrosive chemicals, have high thermal conductivity and superior dimensional stability even at high temperatures over long term use. The bearings, seals and brakes according to the present invention have coefficients of friction of about 0.15 to about 0.7 and a steady state wear rate of less than about $40 \times 10^{-10}$ cm/cm.

The foregoing, and other features and advantages of the present invention, will become more apparent from the following description and accompanying drawing.

BRIEF DESCRIPTION OF THE DRAWINGS

FIGS. 3 through 6 show wear data for articles according to the present invention.

BEST MODE FOR CARRYING OUT THE INVENTION

Figure 1:
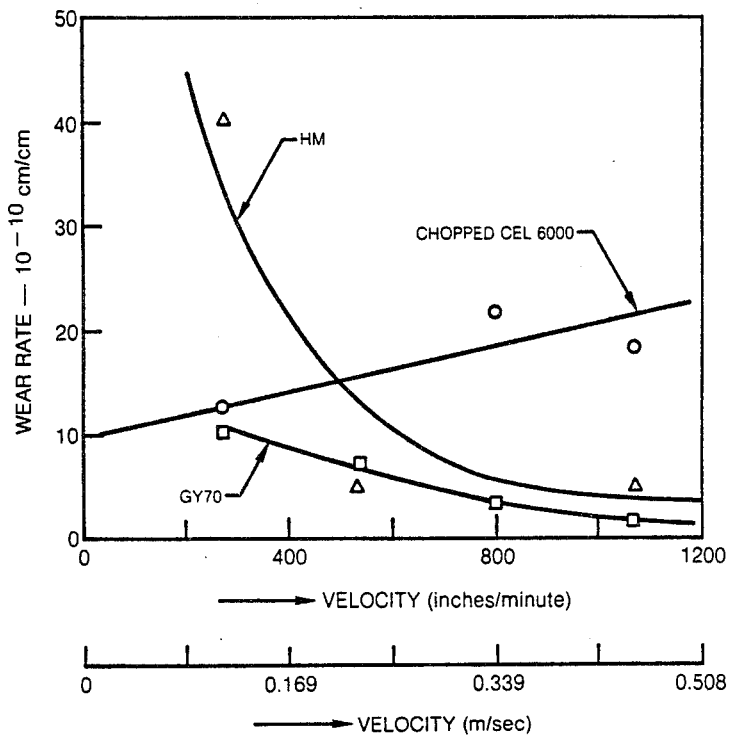
FIG. 1 shows wear data for three composite samples according to the present invention.

The bearings, seals and brakes according to the present invention are generally of the type where low friction and high wear resistance with good sealing properties are necessary, for example, sleeve bearings and brake shoes experiencing continuous contact. The improved properties which distinguish the bearings, seals and brakes of the present invention over those of the prior art are: low coefficient of friction and self lubrication; low wear rate (as much as two orders of magnitude less than graphite fiber reinforced metal); chemical inertness (moisture, acids, bases, UV radiation); elevated use temperature; high strength, stiffness and toughness; low density; exceptional dimensional stability, i.e. very low coefficient of thermal expansion; electrical and thermal conductivity; and low fabrication cost.

The two major components of the present invention are graphite fiber and glass matrix material. The graphite fiber is selected for its high strength, high modulus of elasticity, low coefficient of friction and high thermal conductivity. The glass matrix is selected for its low coefficient of thermal expansion, preferably matched closely but not equal to that of the graphite fibers used, (because of the highly negative axial coefficient of thermal expansion of the graphite and the positive but small coefficient of thermal expansion of the glass), and its chemical inertness and thermal stability.

While any high strength graphite fiber with the requisite modulus of elasticity to produce a thermal conductivity greater than 30 BTU inch $hr^{-1} ft^{-2} °F.^{-1}$ can be used to make the articles of the present invention, Celanese ® (Celanese Corp. of America) GY 70 (formerly DG-102) graphite fibers are particularly suitable. The fiber is used at about 20% to 70% by volume based on the graphite-glass article and preferably in amounts at the lower end of the range, e.g., 25% to 40%. Although not possessing the same self lubricating characteristics provided by the graphite fiber reinforced system, a silicon carbide reinforced glass matrix composite does possess the advantage of exceptional oxidation resistance up to temperatures of as high as 1000° C. Therefore, such fibers can be considered where such property is tantamount.

The glass used is particularly selected to have a low coefficient of thermal expansion preferably matched as closely as possible to the graphite fibers used. Particularly suitable for the purposes of this invention is a borosilicate glass (Corning Glass Works 7740) with an anneal point of 560° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm°C. $\times 10^{-7}$ and a modulus of elasticity of $9.1 \times 10^6$ psi ($6.3 \times 10^{10}$ NT/M$^2$). The particle size of the glass should be such that at least 90% passes through a $-325$ mesh screen. While borosilicate is the preferred glass, high silica content glass (Corning 7930 containing about 96% by weight silica), aluminosilicate glass (Corning 1723), or mixtures thereof with each other or the borosilicate glass can also be used. And while the matrix has been described in terms of glass, it would also be reasonable to expect that the use of a glass-ceramic matrix would provide at least comparable performance. See U.S. patent application Ser. No. 121,081, now U.S. Pat. No. 4,324,843 which is incorporated by reference.

As stated above, the composites of the present invention are particularly suitable for use in high temperature environments because of their high impact resistance, flexural strengths especially at high temperatures, and their uniformity of heat distribution. A key contributing factor to these properties is the high thermal conductivity of the composites. Surprisingly, it has been found that relatively small increases in the Young's modulus of the graphite fibers used in the composites of the present invention produce significant increases in the thermal conductivity of composites made according to the present invention. Experimentally measured composite strength, stiffness and thermal conductivity data are presented in Table I for composites of the present invention.

A variety of methods can be used to produce the articles of the present invention, e.g., methods conventionally used to process glassware articles. However, even greater flexibility in processing is permitted with articles of the present invention because of the superior fracture toughness and thermal conductivity of such articles. For example, sheets of the carbon-fiber glass composition can be formed by laying the carbon fibers in layers with the glass in between and surrounding the layers and hot pressing to form the composite. The formed composite can then be processed into the desired form by die molding at, e.g., 1200° C. The forming step can include deforming to the shape of a curved plate or sleeve. Alternatively, the fibers and glass could simply be laid in a mold of the desired shape prior to molding. And cylinders or other symmetrical forms of the material of the present invention can also be formed by pull-trusion, i.e., pulling the graphite plus glass through a forming die shaped to the desired cross section form. Unidirectional lay-ups of the fibers along the axis of the article are particularly adapted to the latter method.

TABLE I

| Sample No. | Fiber Elastic Modulus (GPa) | % Increase in Fiber Elastic Modulus Over Sample No. 1 | Composite Flexural Properties | | Composite Thermal Conductivity (BTU inch $hr^{-1} ft^{-2} °F.^{-1}$) | % Increase in Composite Thermal Conductivity Over Sample No. 1 |
|---|---|---|---|---|---|---|
| | | | Strength (MPa) | Modulus (GPa) | | |
| 1 | 350 | — | 620 | 180 | 15.5 | — |
| 2 | 537 | 53.4 | 432 | 275 | 31.0 | 100% |
| 3 | 654 | 86.9 | 683 | 332 | 45.0 | 190% |

A preferred method for forming the articles of the present invention is by hot pressing the mixture of graphite fibers and glass. This method gives particular design flexibility in orienting the gradient, and sheets formed by such method are particularly adapted to hot pressing into the desired shapes. An exemplary method comprises continuously unwinding a tow of graphite fibers from a spool at a moderate rate of speed and passing such fibers through a slip of powdered glass, solvent and plasticizer to impregnate the tow. The impregnated fibers are then unwound onto a larger rotating spool. An exemplary slip composition may be composed of 40 grams of powdered glass in 780 ml of propanol. An alternative composition may comprise 85 grams of the glass and 200 grams of propanol, 10 grams of polyvinyl alcohol and 5 drops (approximately 1 cc) of a wetting agent, Tergitol ®. The receiving drum is preferably run at 1 revolution per minute or linear speed of 5 feet per minute (1.5 meters per minute). Excess glass and solvent can be removed by pressing a squeegee against the drum as it winds. Preferably the ground glass is sized so that 90% of it passes through a $-325$ mesh sieve. The thus impregnated tape is then dried either at ambient temperature or with a radiant heating source to remove solvent.

Following the impregnation the fiber is removed from the drum and cut into strips to conform to the dimensions of the article to be fabricated. The fibers are then preferably laid in alternating ply stack-up sequence of 0° and 90°. The assembled composite is then hot pressed, either under vacuum or inert gas such as argon, in metal dies coated with colloidal boron nitride, or graphite dies sprayed with boron nitride powder, at pressures of 6.9 to 13.8 MPa (1000–2000 psi) and temperatures of 1050°–1450° C. Additional glass in the form of powder may also be inserted between each layer as it is laid if necessary to achieve the preferred 20% to 70% by volume loading of graphite fiber in the composite. Also, the mold can be vibrated to insure uniform distribution of the glass over the laid fiber surfaces.

While a 0° and 90° fiber lay-up has been used for illustration purposes, any multi-directional fiber lay-up may be used, such as 0°, 30°, 90° or 0°, 45°, 90°, etc.

Unidirectional fiber lay-ups may also be used as can randomly arrayed chopped fiber reinforcement distributions.

While all of the properties resulting from the combination of graphite fibers and glass matrix as disclosed herein contribute to the improved articles according to the present invention, including the high resistance to fracture, high strength and chemical inertness, the high thermal conductivity, high thermal stability, uniformity of heat distribution, low coefficient of friction, and low wear rate make the articles of the present invention particularly attractive for industrial and domestic use over conventional articles of the prior art.

Because of both the high and low temperature environments which the articles of the present invention will typically be used in, testing was performed between 300K and 1000K to demonstrate the composite strength and fracture toughness of the articles under adverse temperature conditions. In all cases, the articles were able to withstand high loads with increasing strain after initial fracture, and in all cases the articles remained substantially intact at the conclusion of testing.

Improved strength both hot and cold, including high modulus and flexural strength are key properties of the articles of the present invention. This is particularly important since such strength is maintained in spite of the rigorous thermal cycling such articles can be subjected to, both in industrial and domestic environments. The high thermal conductivity coupled with lubricity, gas and liquid impermeability, chemical inertness and thermal stability allow for increased utility for the articles of the present invention.

It is quite surprising that two brittle materials such as graphite and glass can produce in combination such fracture tough, thermally stable articles. For example, in general all glass articles during formation have to be cooled slowly to avoid cracking. However, articles of the present invention have such a high degree of fracture toughness that such slow cooling is not necessary. Furthermore, because of the high thermal conductivity of such articles, cooling takes place not only much more uniformly, but much more quickly as well. And the high fracture toughness of articles of the present invention allow machining to almost any desired shape. The presence of the fibers inhibits microcrack formation during machining and during use.

Two sets of experiments were performed to demonstrate the unique qualities of wear resistance and low coefficient of friction achievable with the bearings, seals and brakes according to the present invention. In one test, right circular flat faced cylindrical pins of 0.32 cm (0.125 in) diameter were machined from graphite fiber reinforced glass matrix composite materials according to the present invention. This pin was placed against a 99.5% (by weight) pure titanium disk under a 1 pound load (4.45 NT) on a track 0.85 in (2.15 cm) in diameter. In each test, the disk was rotated beneath the pin and the relative wear of the pin and disk was measured by the vertical displacement of the pin as a function of time. This measurement thus includes both any change in length of the pin as well as any change in the relative position of the disk surface. In addition, the coefficient of friction was measured throughout the tests. All tests were performed at room temperature in air and without any lubricant.

In the second test, a hardened 4140 steel pin (hardness of $R_c=58$) with rounded nose was placed in contact with graphite fiber reinforced glass composite disks according to the present invention. All tests were performed at a constant relative velocity of 0.025 meter per second in room temperature air and without lubricant. As in the other above described procedure, a vertical load was applied to the pin; however, in this case the magnitude of this force was varied from a low of 50 grams to as high as 3 kg.

Three samples were tested in the first test against the titanium disk. Fiber and composite properties are summarized in Table II and III.

The first composite consisted of 60% by volume of continuous Hercules HMS fibers in a 7740 borosilicate glass matrix. The fibers were oriented in a symmetrical array of alternating 0° and 90° plies. The fibers are of "intermediate" elastic modulus when compared to the range of graphite fiber properties currently available. Composite properties for a 0° orientation composite are also shown.

The second composite was similar to that described above except that the fibers, produced by the Celanese Corp., have a higher elastic modulus. 0°, 90° orientation was used in the test, although 0° composite properties are shown here also.

The third composite consisted of a 2-D (in plane) array of chopped graphite fibers, also in a borosilicate glass matrix. These fibers were 1.9 cm in length and, because of their random distribution, occupied only approximately 30% of the volume of the composite.

TABLE II

Summary of Fiber Mechanical Properties

| Fiber Type | Source | Density gm/cm$^3$ | Elastic Modulus GPa | Tensile Strength MPa |
|---|---|---|---|---|
| HMS | Hercules | 1.8 | 350 | 2700 |
| GY-70 | Celanese | 1.96 | 516 | 1860 |
| Cel-6000 | Celanese | 1.76 | 234 | 2760 |

TABLE III

Summary of Composite Mechanical Properties

| | | | Flexural Properties | |
|---|---|---|---|---|
| Fiber Type | Orientation | Vol % Fiber | Strength MPa | Elastic Modulus GPa |
| HMS | 0 | 60 | 620 | 180 |
| HMS | 0/90 | 60 | 325 | 64 |
| GY-70 | 0 | 60 | 432 | 275 |
| GY-70 | 0/90 | 60 | 300 | — |
| Chopped Cel-6000 | 2-D Random | 30 | 400 | 55 |

In the case of the 0°, 90° cross ply composites, the pins were oriented in such a way as to have half of the fibers running parallel to the pin axes and the other half at right angles to this axis. For the 2-D random chopped fiber reinforced composite, the pins were also removed in such a way as to have the pin major axis in the major plane of reinforcement. Thus, in both of the above cases many fibers intersected the pin faces which came in contact with the titanium disks. This apparently had a controlling effect on the dynamic coefficient of friction measured. In all cases, regardless of composite type or test velocity, the coefficient of friction was measured to be $\mu=0.15\pm0.01$. It should be noted that surprisingly this constancy existed despite major variations in fiber type, fiber content, and fiber orientation.

The combined measured wear of each of these composites is presented in FIG. 1 as a function of the relative velocity between pin and rotating titanium disk. In this Fig., the wear rate is expressed in terms of cm of pin vertical travel per cm of disk material motion beneath the pin. For both of the continuous fiber reinforced composites, a significant decrease in wear rate was measured with increasing velocity. These measurements were taken only after a steady state behavior was achieved during each test condition and represent exceptionally low rates of wear, particularly at the higher velocity conditions. In contrast to these specimens, the discontinuous fiber composite pins exhibited a slight increase in wear rate with increasing velocity, however, again the wear rates were, in general, extremely low.

As was mentioned, the wear rate measurement takes into account the combined changes of both pin and disk. Because of the extremely small magnitudes involved, it was not attempted to separate these effects or continue the experiments long enough to achieve readily measured changes, however, the titanium disk surface exhibited no obvious signs of wear after any of these tests. This is particularly important since it could be expected that even slight amounts of eroded glass could form an abrasive between pin and disk; however, no such effect was noted. The composite pin end simply appeared polished. By steady state wear rate is meant the wear rate of this test, i.e. the articles according to the present invention have steady state pin-on-disk wear rates less than $40 \times 10^{-10}$ cm/cm, and preferably less than $25 \times 10^{-10}$ cm/cm, against a titanium metal disk at disk speeds up to 1200 inches per minute (0.508 meters per second).

The second set of tests were performed on a 2-D random chopped graphite fiber reinforced composite. As mentioned previously, the 0.64 cm diameter steel pin had a rounded end in contact with the composite and the pin hardness was measured at 58 on the Rockwell C scale.

A typical test record is shown in FIG. 3 where both the coefficient of friction (3a) and change in weight of the composite disk (3b) are recorded as a function of the total distance covered by the pin over the disk surface. All tests were performed in air at room temperature with a relative sliding speed of 2.6 cm per second. In this first example, in which a 50 gm load was applied to the pin while it was riding on the surface of a 2-D chopped graphite fiber reinforced specimen, there was a gradual mass gain measured for the composite disk which stabilized after 100 meters of relative motion at a level of $0.2 \times 10^{-3}$ gm. Also, the coefficient of friction stabilized at an average value of approximately 0.25. A comparison was also made between the initial and final weights of the steel pin and it was found that total metal removal was approximately $-0.05 \times 10^{-3}$ gm. This does not account for the mass gain of the disk; however, both values are so small as to make accurate correlation impossible. The band of $\mu$ values is a result of the continuous measurement and slight changes in contact between the pin and disk.

By increasing the load applied to the pin to 200 gm as shown in FIG. 4, a major change in performance was found. Instead of a mass gain, the disk experienced a gradual mass reduction (4b). After approximately 50 meters of relative motion the rate of mass loss stabilized at a value of approximately $1.2 \times 10^{-6}$ gm per meter and at the conclusion of the test at 300 meters a total of $-0.9 \times 10^{-3}$ gm of mass was removed. At the same time, the final change in mass of the pin corresponds to a loss of $1 \times 10^{-3}$ gm. Thus, both pin and disk were very slowly worn. High magnification examination of the composite surface revealed that only slight changes could be found. Some slight graphite fiber removal and a small amount of smeared metal deposit were the only visible signs of wear. It can also be noted from FIG. 4a that the value of $\mu$ remained quite steady at 0.3 with overall fluctuation being considerably less than in the previous case.

Additional tests performed with 1 kg and 3 kg applied normal pin loads resulted in the data shown in FIGS. 5a and 5b and 6a and 6b, respectively. The data in FIG. 5, unexpectedly, indicates that the application of a 1 kg load results in both a lower net mass change (5b) rate and also a lower coefficient of friction (5a). At an applied load of 3 kg, however, a major increase in wear of both the pin and disk was noted. This was accompanied by a large increase in $\mu$ and also the presence of an audible squeal during the test. Apparent damage to the composite surface could be detected by microscopic examination, while wear of the pin was indicated by the 2 mg of pin mass lost, as well as a small flat worn on the tip of the rounded pin end.

Somewhat similar wear behavior of the 0°, 90° SiC fiber reinforced glass composite was noted for 1 kg and 3 kg applied normal loads respectively. A major difference was noted in that the coefficient of friction was considerably higher for the 1 kg load than was measured under similar conditions in the graphite-glass test. However, the silicon carbide does provide an exceptionally useful reinforcement for glass matrix composites because of its excellent oxidation resistance and high hardness.

Accordingly, it can be clearly seen that it is possible to achieve exceptionally low coefficient of friction and low wear rates with the articles of the present invention. Referring to the composite pin on metal disk data, it is seen that a coefficient of friction ($\mu$) of 0.15 was achieved for all three composites tested. The two continuous 0°, 90° fiber reinforced composites contained approximately 60%, by volume, fiber and were vastly different in structure to the 2-D random chopped fiber composite which contained only 30% fiber. Yet surprisingly, all three of these materials were characterized by the same low value of $\mu$. Even a relatively small amount of graphite, supported within a very hard matrix of glass, provides a considerable amount of self lubrication. The glass adds the observed level of resistance to wear, even when subjected to fairly high loads applied to the hemispherically tipped steel pin (steel pin on composite disk test).

A performance comparison with graphite fiber reinforced aluminum was made. In these tests, apparatus similar to the first test above was used with graphite reinforced aluminum and unreinforced aluminum pins in contact with a pure iron disk. Although not identical to the experiments performed for graphite-glass, test conditions were similar enough to warrant the data comparison presented in Table IV. Even at the fastest velocity of test, the glass matrix composite wear rate was only 4% of that of the graphite aluminum. At the higher test velocity this decreased to 1.5% of the aluminum matrix composite and 2.7% of the unreinforced aluminum. Glass matrix composite component life could thus be expected to be 25 to 67 times longer than for a similar aluminum matrix composite part. As an added benefit, the glass matrix composite coefficient of friction might also be significantly lower.

TABLE IV

| | Comparison with Graphite Reinforced Aluminum Composite | | |
|---|---|---|---|
| | Glass Matrix Composite | Aluminum Matrix Composite | Unreinforced Aluminum |
| Pin Material | | | |
| Matrix | Glass | 201 Aluminum (4.7% Cu alloy) | 201 Aluminum |
| Fiber | 60 v/o* Graphite (0/90) | 35 v/o (all 0° type T-50) | None |
| Disk | CP Titanium | Iron | Iron |
| Steady State Coef. of Friction ($\mu$) | 0.15 | 0.23 | 0.48 |
| Steady State Wear Rate (cm$^3$/cm)** | | | |
| at Velocity = 0.2 (m/sec) | $6.0 \times 10^{-10}$ | $4.0 \times 10^{-8}$ | $2.2 \times 10^{-8}$ |
| 0.3 (m/sec) | $4.0 \times 10^{-10}$ | $5.0 \times 10^{-9}$ | $2.2 \times 10^{-8}$ |
| 0.4 (m/sec) | $2.0 \times 10^{-10}$ | $5.0 \times 10^{-9}$ | $2.2 \times 10^{-8}$ |

*v/o = volume percent
**This is the volume of pin material removed (in cubic centimeters) per unit distance of travel (in cm) of the pin on the disk surface It should be pointed out that fiber strengthened glasses can be machined, and formed, into complex shapes. The duplex fiber-matrix microstructure permits machining using conventional carbide tools without causing fracture of the part. The graphite is soft and easily machined. In addition, it can be machined by electric discharge machining because of its electrical conductivity. The parts can also be machined on a lathe using standard machine shop practice.

In addition to the extremely good friction and wear characteristics and machinability of the bearings, seals and brakes according to the present invention, the stability properties of the composite add an extra dimension to this hardware. Because of the high temperature stability of these composites, they are usable at much higher temperatures then either resin or metal matrix composites. Furthermore, because of their chemical inertness, the hardware would be usable in many environments unacceptable for either resin or metal. Both of these factors contribute to superior dimensional stability over long term use regardless of temperature or chemical environments, and thus, bearings, seals and brakes according to the present invention will maintain critical dimensional tolerances far superior to other composites in this environment.

Figures 2A, 2B:
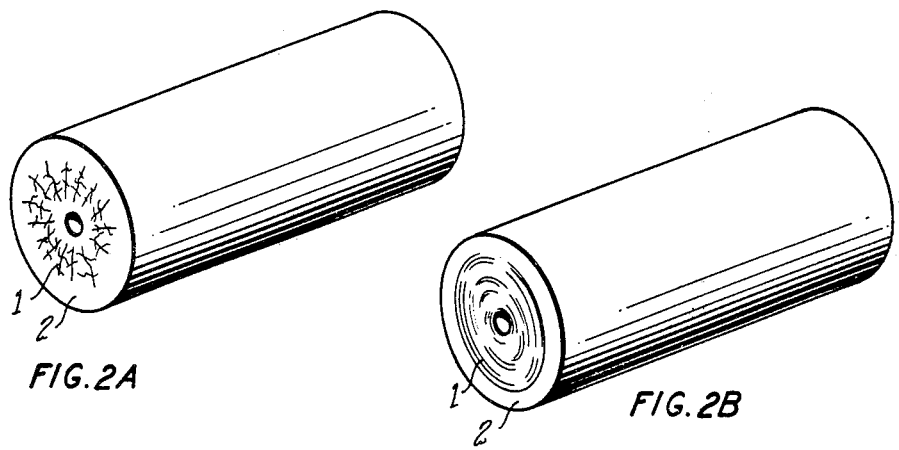
FIG. 2 shows sleeve bearings according to the present invention.
Figure 5A:
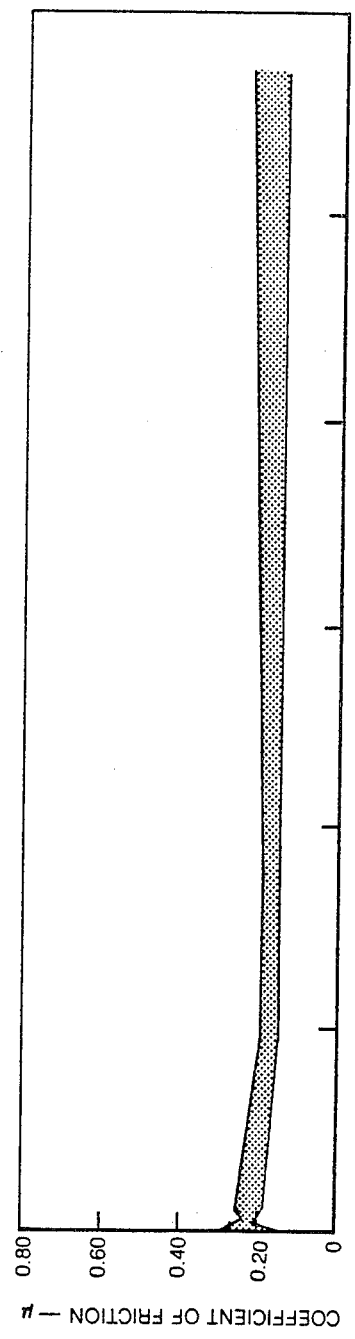
Figure 5B:
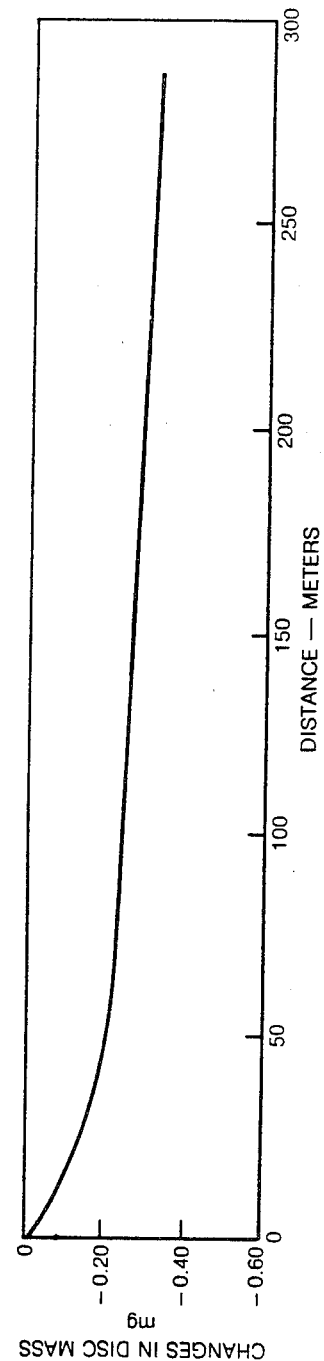
Figure 6A:
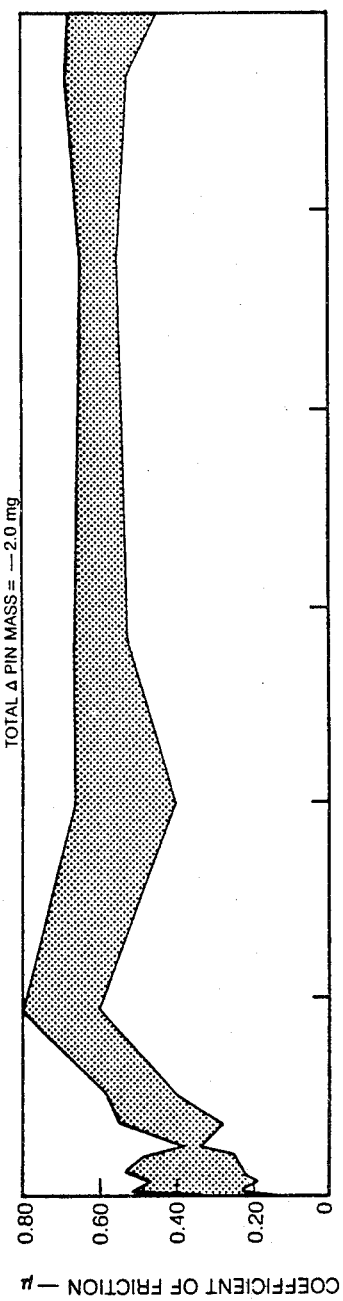
Figure 6B:
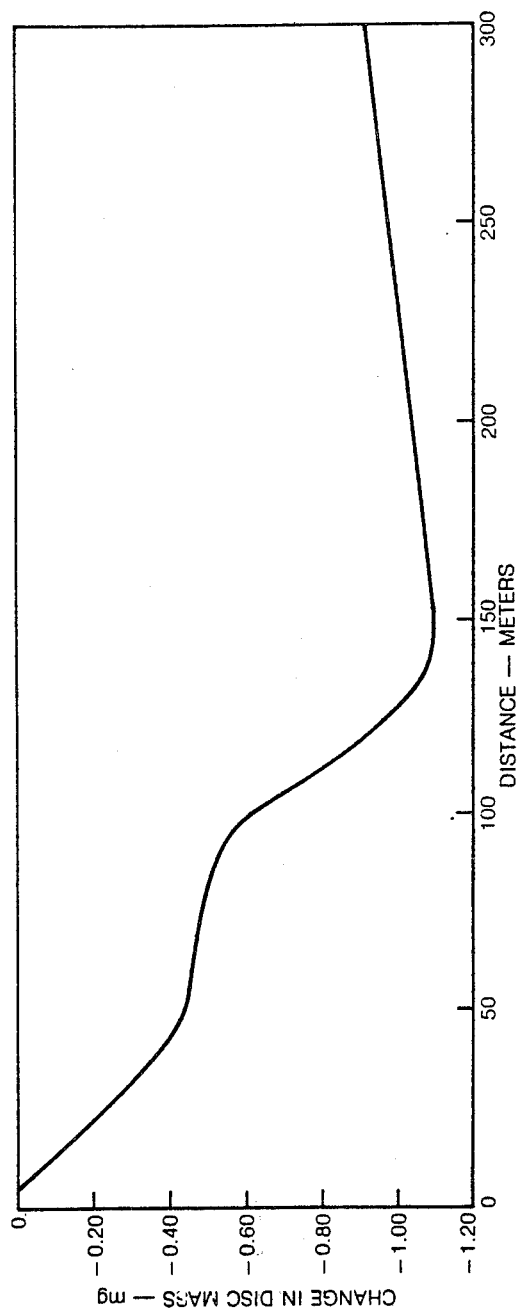

Bearings particularly adapted to the present invention are sleeve bearings as opposed to the rod or ball type. In the formulation of sleeve bearings according to the present invention, both cylindrical wrapping and perpendicular wrapping of discontinuous fibers can be used. Note FIGS. 2a and 2b where 1 represents the graphite fibers and 2 the glass matrix.

Seals according to the present invention are particularly useful in a shaft or a rodlike environment where both lubrication and sealing properties are desired. For example, where a shaft containing a rod separates a wall with different fluids such as air on one side and a liquid such as water on the other side, and movement of the rod is required, a seal according to the present invention is particularly beneficial. Because of the close tolerances and chemical inertness necessary for such a seal and the friction and wear properties of a seal according to the present invention, such use represents a definite advancement in this art.

Brakes according to the present invention are specifically adapted to be in constant touch with a moving surface such as conventional brake shoes. However, brake disks such as for airline use are also contemplated. Note FIG. 6 which demonstrates the increased coefficient of friction with higher loads and maintenance of that coefficient of friction over long distances without fading.

Although this invention has been shown and described with respect to detailed embodiments thereof, it will be understood by those skilled in the art that various changes in form and detail thereof may be made without departing from the spirit and scope of the claimed invention.

I claim:

1. A bearing, seal or brake material comprising a graphite fiber reinforced glass matrix having a coefficient of friction of about 0.15 to about 0.7 and a steady state wear rate less than about $40 \times 10^{-10}$ cm/cm.

2. The article of claim 1 having a steady state wear rate less than about $25 \times 10^{-10}$ cm/cm.

3. The article of claim 1 comprising about 20% to about 70% by volume graphite fibers.

4. The article of claim 1 wherein the glass matrix comprises borosilicate glass, aluminosilicate glass, high silica content glass or mixtures thereof.

5. The article of claim 1 wherein the graphite fibers have a 0°; 0°, 90°; or random fiber orientation.

* * * * *